No. 635,815. Patented Oct. 31, 1899.
E. A. SPERRY.
SYSTEM AND APPARATUS FOR CONTROLLING ELECTRIC VEHICLES.
(Application filed Sept. 6, 1898.)
(No Model.) 3 Sheets—Sheet 1.

WITNESSES:
Budd Gray.
M. C. Prendergast.

INVENTOR
Elmer A. Sperry
BY Buckingham & Ewort
ATTORNEYS.

No. 635,815. Patented Oct. 31, 1899.
E. A. SPERRY.
SYSTEM AND APPARATUS FOR CONTROLLING ELECTRIC VEHICLES.
(Application filed Sept. 6, 1898.)
(No Model.) 3 Sheets—Sheet 2.

WITNESSES
Budd Gray.
M. C. Prendergast.

INVENTOR
Elmer A. Sperry.
BY Buckingham & Ewart
ATTORNEYS.

UNITED STATES PATENT OFFICE.

ELMER A. SPERRY, OF CLEVELAND, OHIO, ASSIGNOR TO THE CLEVELAND MACHINE SCREW COMPANY, OF SAME PLACE.

SYSTEM AND APPARATUS FOR CONTROLLING ELECTRIC VEHICLES.

SPECIFICATION forming part of Letters Patent No. 635,815, dated October 31, 1899.

Application filed September 6, 1898. Serial No. 690,359. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Systems and Apparatus for Control of Electric Vehicles, of which the following is a specification.

My invention relates to a system and apparatus for control of electric vehicles; and it consists in various arrangement of parts and construction of details, arrangement of circuits, and means for changing such relation, in connection with separate generating units, motor or motors, electric brakes, resistances, &c.

The invention has for its object to combine, in a single operating system for vehicles, starting, varying the speed, and instantaneously stopping with the least possible inconvenience to the operator and without calling forth at any time an excessive effort on the part of the operator to place under his control power-brakes far more powerful than mechanical brakes and at the same time applying the brakes to all the wheels of the vehicle simultaneously instead of only to the driving-wheels, as heretofore.

The invention further consists of details of construction and arrangement of parts tending to cheapen the production of electric vehicles.

These objects are attained by mechanism, details, and circuits shown in the accompanying drawings, in which—

In the drawings like letters of reference indicate similar parts throughout the several views.

Figures 1, 2, 3, 4, 5, 11:
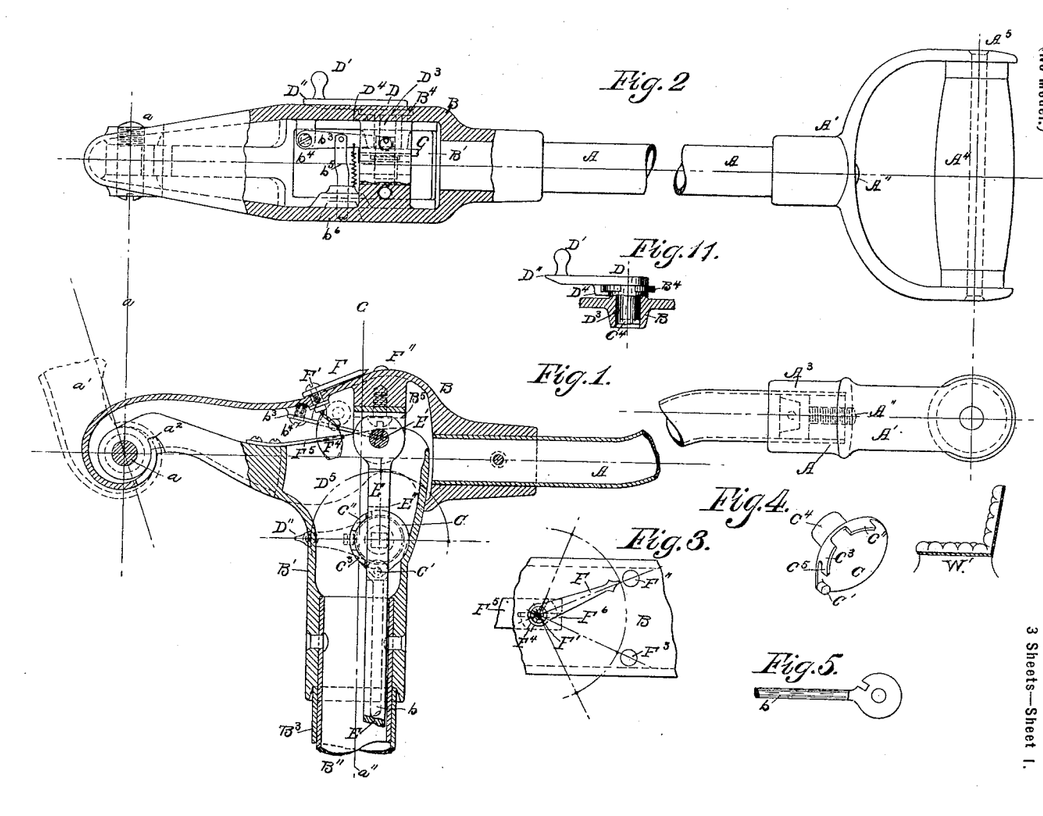
Figure 1 illustrates a side elevation, partially in section, of a controlling-handle.
Fig. 2 shows a plan of the same.
Fig. 3 is a detail of the indicator.
Figs. 4 and 5 are details of the interlocking and switching mechanism.
Fig. 11 is a detail of the key.

Referring now to Fig. 1, it may be seen that a handle-bar A is served at one end with a swiveling handle A', secured by the threaded part A'', holding the socket $A^3$ from being readily removed. This bar at the other end is secured to any form of pivot. The handle may be of any suitable shape; but I prefer the spade-handle, having general shape shown in the drawings, which is provided with the grip $A^4$, which is preferably loose upon the stem $A^5$. Thus it will be seen that the grip is independently moved in two planes—viz., about the axis $A^5$ and free to swivel upon the end of the handle-bar proper, A. The hollow moving frame B is preferred for securing the handle-bar A, pivoted on line $a$ and being capable of a considerable arc of movement, the extreme backward movement being indicated by dotted lines at $a'$, where the frame engages a stop at point $a$, Fig. 2. The pivot $a$ serves to secure the swinging handle-bar and frame B to its support B', which also may be of any suitable form and supported in any suitable manner; but I prefer to attach this part to a tube B'', which is free at the same time to swing about the vertical axis $a''$, resting and being guided within the journal $B^3$. The frame B is open upon its lower side and incloses the upper portion of the support B'. This support serves to hold a disk C, (see Fig. 4,) which is provided with a crank-pin C', and certain peripheral projections C'' and $C^3$; also, a hub $C^4$. This latter protrudes through the aperture in the support and at its outer end receives the crank-like pointer-shaped key D, provided with a handle at D' and a pointer at D''. (See Fig. 11.) In this figure will be seen the square stem $D^3$ and the hook $D^4$. This latter portion serves to hold the key in position from the fact that it finds itself behind the flange $B^4$, protruding from the frame B. This flange is provided with a notch constituting a release for the retainer $D^4$ in its top, at which point the key may be withdrawn and inserted. These are also plainly seen in Fig. 11. Upon swinging the key to the three points indicated in the circle $D^5$, Fig. 1, it will be seen that the link $b$, the head of which is pivoted upon the crank-pin C' and its flange locked back of the projecting lip C⁵, Fig. 4, is raised to three different positions, being shown in Fig. 1 in its lowest position, and its lower end (seen in Fig. 9) being shown in its middle position and being capable of still a higher position when the pointer D" stands horizontal and points to the right (see Fig. 6) or exactly the reverse of its position as indicated in Fig. 1.

The movements of the handle-lever A through a limited radius serve to communicate motion to the rack-stem E through any form of pivot, preferably the removable pivot shown at E'. This pivot preferably slides within a guiding-post—for instance, the jaw B⁵—and is actuated by the lever $b^3$, pivoted at $b^4$, and actuated by the pin $b^5$, protruding within a cavity $b^6$, as shown in Fig. 2. The spring seen in Fig. 2 tends to retain the pin E' in its engaged position.

The frame B is seen in Figs. 1 and 3 to support still another feature, known as the "pointer" or "indicator" F. This indicator may move in any suitable manner—for instance, slide or produce any indicating motion; but I prefer the one shown in the drawings, in which it revolves around an axis F' through a suitable arc—for instance, that shown by the dotted lines. A plurality of buttons F" and F³ or other marking-points are used to indicate the various positions or the approach of the pointer F to certain predetermined positions in its movement. The movement of this pointer is effected in any suitable manner; but I prefer the auger-like fin F⁴, seen in elevation in Fig. 1, as protruding through a slot in the plate F⁵, which in turn is secured to the support B'. It will readily be seen that as the handle-bar A and frame B rise and fall about the pivot $a$ the auger-like twisted fin F⁴ in passing through the slot F⁶ (see Fig. 3) in the plate F⁵ will cause the stem to rotate about its axis F' and the pointer to swing through a considerable arc. The advance of this pointer may be made to indicate any number of positions of the controller or connected parts, as will readily be understood. I have reduced these points to two—viz., F" and F³—and use the regions in the two outer arcs to indicate other positions of the controller, which will be discussed later on.

The handle-pivot $a$ is preferably removable and is shown in Fig. 2 as consisting of a screw. It will readily be understood that this whole stem, consisting of handle, handle-bar, and head-piece complete, may turn about its vertical axis $c$, and at the same time the handle-bar A and its connected frame may rise and fall upon the support B'. This swiveling action is promoted and lost motion laterally is prevented by the lateral fit of the swinging frame B, especially at its extremes—viz., at or near the pivot $a$ and the back end of the handle A and the portion near the attached end of the handle-bar A'. This is fully illustrated in Fig. 2 and need not be more fully described herein.

Passing now to the lower end of the tube B" (shown in Fig. 9) we find that it is provided with a crank-arm or equivalent B⁶, to which is connected the steering-gear of the vehicle in any suitable manner—for instance, that described and illustrated in my former application, Serial No. 579,794. We here also find the link $b$ secured to the pivot end $b'$ and to the crank $d$, connected to the axle $d'$, on which is supported suitable electrical circuit-changing apparatus described herein. It may be explained that the joint between the link $b$ and the pivot $b'$ is a swiveling joint, longitudinal movement being prevented by the screw-threads shown at $b^2$. The rack-stem E we also find present adjustably secured into the rack $e$ by threaded part and jam-nuts shown provided with any suitable pivot adapted to engage the gear or segment $e'$; but I prefer that the teeth $e''$ of this rack should be convex, or, still better, circular, or a pivotal joint may be located between a rack of the ordinary construction and the head E' or handle-bar A; but the arrangement shown is preferred, leaving the teeth perfectly free to rotate within the teeth of the gear while the connected parts are moving into other different lateral positions.

The gear $e'$ is mounted upon and serves to actuate the controller-shaft $f$. In this connection attention is called to the fact that while the controller-handle and its connected parts above have but a limited angle of movement the structure and connections are such that the angle of movement of the controller is multiplied, so that the small angular movement of the handle gives a large or larger angle of movement of the controller, so that all of the various functions required of the controller may be easily performed and the electrical contacts upon its face may each be given a sufficiently large active surface to insure the best results. This increase of angle is utilized to allow the same controller to perform all functions necessary in connection with the speed-changing while the power is being applied to the motor and also all the variations in application of the electric brake, all of which is fully pointed out in the present specification.

Figure 9:
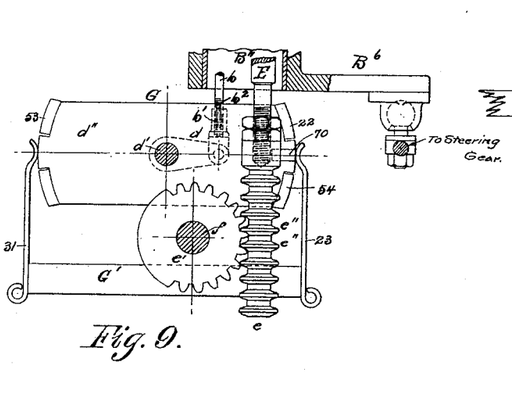
Fig. 9 illustrates the lower connections for the controlling-handle and reversing-switch.
Figure 10:
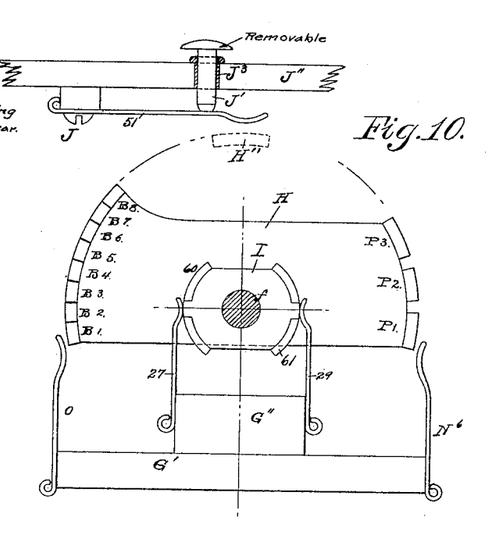
Fig. 10 is a diagrammatic end elevation of controller.

The mechanical structure of the circuit-changing apparatus, elevation of which is shown in Figs. 9 and 10, will readily be understood from the figures. The contacts, numbered 53, 22, 54, and 70, are supported so as to move with the shaft $d'$ by intermediate non-conducting material, shown in the present drawings as being in form of a block $d''$. Coöperating with these contacts are stationary contacts 23 and 31, these two only being seen in the elevation. The four contacts coöperating with the combined charging and reversing switch G are secured to any suitable support—for instance, that shown at G'. In Fig. 10 we find a similar support G', securing the stationary contacts O and N⁶, one serving upon either side of the controller-shaft $f$ and coöperating with the contacts upon the controller H. Upon this shaft is also seen the reversing-switch I, moving with the shaft, and the stationary contacts 27 and 29 coöperating with which are mounted upon the stationary block G″. This controller may be moved in either direction from its center or "off" position, which is shown in the drawings, as will be readily understood, and when moved around clockwise certain of its electrical contacts find themselves in position, (indicated at H″,) whereupon it may be engaged by the contact 51, secured to a stationary part of the vehicle at J by depressing the headed pin J′. This pin is supported also by any stationary part of the vehicle—for instance, the floor J″—through a bushing J³, and is removable, as indicated.

Figures 6, 7, 8:
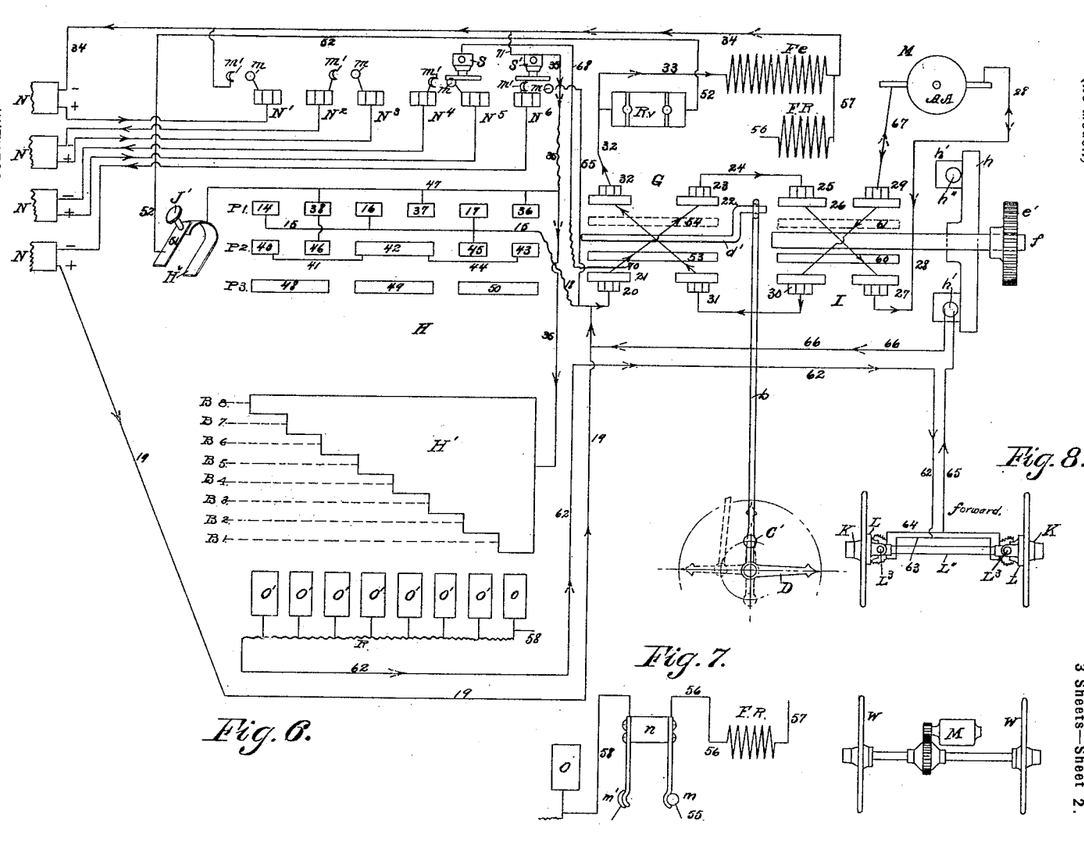
Fig. 6 is a diagrammatic view of the electric circuits of the vehicle.
Fig. 7 is a detail thereof.
Fig. 8 is a diagrammatic view of the running-gear of the carriage, showing the motor and brake.

The mounting of the brake-wheels with reference to the running-gear is shown as a whole in diagram in Fig. 8 and will be seen to be at the forward end or the end away from motor M. The swivels L³ L³ are here plainly seen at the ends of the forward axle L″. Here also may be seen the circuits of the brake-magnet, (indicated by the wires numbered 63 and 64,) which are shown as being flexible around the pivots L³ and are there secured to a stationary part of the vehicle—such, for instance, as the axle L″, running-gear, or body. The shaft $f$ of the controller is provided with a disk $h$, which revolves before the brake-magnet $h'$, shown in section, a coil of which is shown to be circular at $h''$. The magnet $h'$ is stationary and when energized serves to retard to a greater or less degree the action of the controller. This retardation may be adjusted by the strength of the magnet and also is under automatic control by the strength of the current. Any device for retardation of the controller-handle, preferably the one in the braking positions, will serve the purpose, and I therefore will not limit myself to the special design shown.

Turning now to the system of control or arrangement of electrical circuits of the vehicle, as shown in diagram in Fig. 6, it will be seen that the electricity is generated by separate units NNNN, each of which may represent a group of generators, the positive and negative terminals of which are coupled, as shown, to the various circuit-manipulating devices. Their function and relation remain now to be pointed out in detail. To the right is observed the gear or segment $e'$, by means of which the controller-shaft $f$ is manipulated. On this shaft is mounted the reversing-switch I and the controller H, the controller having two active positions—one either side of the "off" position or position of rest, (shown in Fig. 10,) the latter having eleven active positions, three on the power side, (indicated by P′ P² P³,) and B′ to B⁸, as will be readily seen, indicating the brake positions. The brushes coöperating with these various contacts are illustrated by N′ to N⁶, respectively, and those coöperating with the contacts B′ to B⁸ are represented by O and O′ O′, &c. These are suitably connected to the resistance R, as indicated. The reversing-switch G is seen mounted upon its shaft $d'$ and operated by the crank and links $b$ from the crank-pin C′ and pointer D. On the two reversing-switches I and G these contacts are shown with their electrical connections. Leading from the reversing-switch G and also the controller H are flexible wires, (indicated by the waving lines,) which are numbered in the following description: When the controller is so turned that the brushes N′ engage the row P′ of contacts, it will be seen that the current flows through the motor in direction of the arrows as follows: coming from each of the generators N it reaches brush N′, contact 14, wire 15, brush N³, contact 16, wire 15, brush N⁵, contact 17, wire 15, flexible wire 18, and from the last generator by wire 19 to brush 20. Suppose now that the reversing-switch be in the position shown in Fig. 6. The current will enter contact 21, contact 22, brush 23, wire 24, brush 25, contact 26, contact and brush 27, wire 28, through the armature A A of the motor, to brush 29, in the direction of the arrow-heads in full lines to brush 30, 31, and 32, wire 33, field F⁶, wire 34 to the negative of the first battery and wire 35 (part of which is flexible) to contacts 36, 37, and 38, to brush N², returning the current to the second generator, brush N⁴, returning current to third generator, and brush N⁶, returning current to fourth generator, which will thus be seen to have been coupled to the motor in parallel. It will readily be understood that the relation between the reversing-switch I and the controller H is fixed and the direction of the current through it is always as indicated in any of the three power positions. Taking now the second power position obtained by turning the controller in such a way that the brushes N′ to N⁶ rest upon the second row of contacts—viz., P²—we notice that the current generated by the first generator N arrives at brush N′, contact 40, wire 41, and the current coming from the second generator arrives at N³, contact 42, passes back through brushes N⁴ and N⁶, the latter by way of contact 43 and wire 44, to the lower pair of generators, from whence it flows to the brush N⁵, contact 45, wire 15, and thence, as before, by flexible wire 18, joined by current from the last generator, passing wire 19 to contact 20, and thence through the motor or motors, back to the negative terminals of the first two generators, by wires 34 and 35, by way of wire 47, from contact 46, brush N², to the negative of the second generator N, at which point the circuit is complete. Thus it will be seen in this position the motor or motors receive current from two of the generators in multiple, coupled in series with two other of the generators. When the controller is turned to the position P³, the generators are then all in series, the current passing as follows: from the positive of the first generator to brush N′, contact 48, brush N²; second generator, brush N³, contact 49, brush N⁴; third generator, brush N⁵, contact 50, brush N⁶; fourth generator, wire 19, brush 20, to motor and fields and back to the first generator, by wire 34, exactly as above pointed out in reference to the two other power positions. It will be noticed that while in this last power position only the contact H′ is brought into position, so that contact 51 may be forced into electrical connection therewith, whereupon the current from wire 33 will be diverted from the field through the variable resistance Rv and wire 52, thus weakening the field or fields Fe and giving a higher rotative speed to the armature or armatures AA. Furthermore, it will be seen that if the reversing-handle D is so operated that the long contacts 53 and 54 are brought under the brushes 20, 23, 31, and 32, in this case the current arriving at brush 20 will pass over on contact 53 to brush 31, and therefore pass the armature in the directions opposite to the arrow-heads, (full lines,) and not resume the direction of the arrow-heads until it again arrives at brush 32, thus giving a complete reversing action to the motor or motors M connected.

In Fig. 7 the auxiliary field FR is shown in detail with its connections free from the lines of Fig. 6 for sake of clearness. Connected with each of the brushes N′ to N⁶ will be found a pair of convex-concave contacts, (indicated in Fig. 6 by m′.) The changeable, preferably non-reversible, contact n may be connected with any pair of these contacts m and m′, representing any one of the different generators N, which, as will be seen, will furnish current to the auxiliary field FR and other translating devices when the controller H is turned in the reverse direction or in any one of the brake positions from B′ to B⁸. This contact in its engaged position is not shown in Fig. 6, for the sake of clearness, but is clearly indicated in Fig. 7, together with the field connection. Supposing now that the controller is turned in this direction and that the brush O is in contact with the traveling segment H′, and again supposing the changeable contact n to be in connection with the crescent seen near N⁶, the current will then flow from last generator N, wire 19, wire 55, contact m, coöperating contact n, wire 56, auxiliary field FR, wire 57, wire 34, wire 35, brake-contact H′, brush O, wire 58, removable contact n, crescent m′, brush N⁶, back to negative of the last generator, as will be readily understood. Another purpose of the removable contact is that of changing at will of the operator from one to the other of the generators, so that all may be exhausted similarly, and its further use may be indicated by the fact that through the wire 66, which will be seen as being derived from wire 19 above traced, will be furnished energy on this derived circuit for the normal magnetic brake system, principally for the purpose of holding the same after the dynamo-generator has fully stopped or ceased to rotate. This action occurs whenever the brake-circuit may be closed at O O′ and H′, as will readily be understood. The action of the auxiliary field FR is to augment the residual magnetism of the field, making the motor, which now becomes a generator, instantly responsive to current generation even while running at low speeds.

It will be noticed from Fig. 10, taken in connection with Fig. 6, that upon the controller being turned backward, so that the contacts H′ and the brush O or any of the brushes O′ are in contact, a new set of contacts—viz., the long contacts, shown at 60 and 61, respectively—will be brought in contact with the brushes 25, 27, 29, and 30, which again reverses the connections of the armature or armatures and field, the reversing-switch G remaining in either of its positions unchanged, and it is this reversal action of the reversing-switch I which is depended upon to convert the motor or motors M into generators. Assuming now that the generation of current is going forward and that one of the brushes O′ is in contact with the segment H′, the circuit traversed by the current will be seen to be as follows: emanating at brush attached to wire 28 it will flow backwardly through wire 28, as indicated by the dotted arrow-heads, brush 27, contact 60, brush 30, brush 31, thence following the circuits through the field Fe to wire 34 35, segment H′, off the farthest brush to the left O′ which happens to be in contact at the instant with the segment H′ through the resistance R, wire 62, in direction of the dotted arrow-heads, arriving at wire 63, passing the flexible wires into the brake-magnet LL, back by wire 64, joining and passing up wire 65 to the grasping or brake magnet h′, whereby the action of the controller is retarded, wire 66 to wire 19, brush 20, contact 21, contact 22, brush 23, wire 24, brush 25, contact 61, brush 29, wire 67 in direction of the dotted arrow-head to the opposite brush of the motor or motors M, thus completing the circuit. The amount of current thus flowing will be dependent, first, upon the speed of the motor or motors; secondly, upon the amount of resistance R included in the circuit, and, thirdly, upon the amount of effort given to rotating the shaft f of the controller against the gripping or retarding magnet h′. The mechanical energy required for rotation of the armature or armatures AA of the motor, which are geared to the driving-wheels ww of the carriage, will effectually retard their motion and tend to bring the carriage quickly to rest, aided materially by the retardation of the forward wheels by the brake-magnets LL, as will readily be understood. Attention is specially called to the fact that the forward wheels are supplied with braking devices operated by the electric current, which may be generated in any suitable manner—as, for instance, that just described. From the fact that as soon as retardation of motion is commenced, the mass, the center of gravity of which is usually high above the ground, pitches forward, bringing a large mass of the weight over and upon the forward wheels, removing a corresponding amount from the back wheels, and it will be seen that, during the time of braking, the forward wheels bearing, as they do, a materially-increased amount of the load, are the most important factors in stopping and their retardation will tend to bring the mass to rest quicker than an equal amount of retardation brought to bear upon the rear wheels.

Suppose now the generators N are storage batteries which require storing at intervals. I have provided a special means for this purpose, which will be found to eliminate the difficulties heretofore experienced where the controller is required to be placed in the series position prior to charging, which is almost universally the case, and where if the motor-circuits are not opened by some means outside of the ordinary controllers the carriage tends to suddenly start or run away. This trouble I overcome by providing charging-terminals S and S', the former being connected by wire 68 to a special contact 70, located between the running contacts 21 and 53 on the reversing-switch G. (See also Fig. 9.) The direction of the current with the controller turned in position $P^3$ will then be as follows: The current entering the positive post S proceeds by wire 68 to terminal 70, brush 20, wire 19, to the last generator, brush $N^6$, terminal 50, brush $N^5$, to third generator, brush $N^4$, contact 49, brush $N^3$, to second generator, brush $N^2$, contact 48, brush N', to first generator, wire 34, wire 71, to the negative charging-terminal S', it being understood that a reversing-switch handle D is previously placed in the upright or middle position, as shown in Fig. 9, whereby the contact 70 and brush 20 are brought together. When in this position, it will readily be seen from this view, Fig. 9, that all of the other brushes—viz., 23, 31, and 32—are open-circuited, and in this way the motor is effectually out of circuit whenever the charging operation goes forward, and when the motor is in circuit the positive-charging binding-post S is necessarily out of circuit. During this operation it will be understood that the crank-disk C in the head is turned to its middle position and the rack-stem E is allowed to freely pass through the notch separating the flanges C'' and $C^3$, the rack-stem E being effectually blocked against a downward motion whenever the handle D is between its middle and the two outer positions. The notch on the stem may be plainly seen at E'', and in the position in which the pointer D stands in Figs. 1 and 2 the flanges C'' and $C^3$ are both out of its path of movement downward and will therefore not interfere with its downward movement. By following the movements it will be seen that this is also true when the hand D is around to its horizontal position, pointing to the right, and also in its vertical position, pointing upward, whereupon the notch in the collar shown between C'' and $C^3$ affords ample path for its movement. Again, it will be seen that when the rack-stem E has been depressed by the downward movement of the handle, so that the enlarged part above the notch E'' has passed below the circle of movement of the flange C'', Fig. 1, the handle D cannot be moved until the stem is again raised to the position shown in the drawings, Fig. 1. This is also true of any of the three positions of the handle at which the stem E is depressible.

It will be noticed from Fig. 1 that a miniature seat W' is provided as a part of Fig. 1. This illustrates the position of the vehicle-seat or driver's seat in reference to the handle. It illustrates, further, how when the handle is detached by means of the pin E' it is swung backward away from the seat, as shown in dotted lines at $a'$.

It will readily be understood that the elements of the motor or motors M referred to herein are its or their fields and armatures.

The coöperating terminals $m$, $m'$, and $n$ will be seen to constitute non-reversible terminals from the translating device to the various groups of electric generators, the stationary contacts being permanently in connection with such groups.

The use and operation of the various devices have been carefully detailed in connection with a description of their construction and arrangement, and it will therefore not be necessary to further describe their functions.

It will readily be understood that while it is designed to use the above parts in the relation shown, yet some may be used without the others, and the invention extends to such use. It will furthermore be readily understood that the construction and arrangement may be varied without departing from the spirit of the invention.

Having thus described my invention, what I claim, and desire to secure by Letters Patent, is—

1. In an electric system, a dynamo-electric machine used to generate currents periodically, a controller for the circuits of such machine, a set of contacts on the controller, connected with the field-coil of the machine and an electric battery also connected to such last-named set for fixing the residual magnetism of the field of the machine, before starting upon the generating periods.

2. In a system of control for electric vehicles, a controller having two operative positions separated by an "off" position, a plurality of electric generating units, an electric motor upon the vehicle, connections with the controller for coupling the generators in multiple and in series to the said motor for varying the power when at one side of said "off" position and means for reversing the elements of the motor and closing the circuit through a variable resistance and electric friction-brakes, when on the other side.

3. In a system of control for electric vehicles, a controller having two operative positions separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side and means for resisting the movements of the controller.

4. In a system of control for electric vehicles, a controller having two operative positions, separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side, means for resisting the movements of the controller and means for varying the amount of such resistance.

5. In a system of control for electric vehicles, a controller having two operative positions, separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side, means for resisting the movements of the controller and means for varying the amount of such resistance, in proportion to the strength of the braking-current.

6. In a system of control for electric vehicles, a controller having two operative positions separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side and an electric friction-brake for resisting the movement of the said controller.

7. In an electric vehicle, an electric motor, a controller for the motor, having an "off" position, a plurality of power positions and a separate manually-actuated stationary contact adapted to be forced into engagement with a coöperating contact upon the controller when same is in one of its power positions only.

8. In an electric system, a dynamo-electric machine, a controller for the circuits, two series of contacts on the controller, separated by an "off" position, contacts on one side for coupling the circuits for generating, and on the other side, for fixing the residual magnetism of the field-magnets and an electric battery coupled with the contacts on the said last-named side of the controller, for the purpose specified.

9. In an electric vehicle, an electric motor, a controller for the motor, having an "off" position, a plurality of power positions and a separate manually-actuated stationary contact adapted to be forced into engagement with a coöperating contact upon the controller, when same is in its last power position only.

10. In an electric vehicle, an electric motor, a controller for the motor, having an "off" position, a plurality of power positions, a separate manually-actuated stationary contact adapted to be forced into engagement with a coöperating contact upon the controller when same is in one of its power positions only and an electric connection from the contact to the field-magnet coil of the motor.

11. In an electric vehicle, an electric motor, a controller for the motor, having an "off" position, a plurality of power positions, a separate manually-actuated stationary contact adapted to be forced into engagement with a coöperating contact upon the controller when same is in one of its power positions only, an electric connection from the contact to the field-magnet coil of the motor and a variable resistance in such connection.

12. In a system of control for electric vehicles, a controller having two operative positions separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side, an auxiliary field-magnet coil for the motor and means operated by the controller for coupling same to a portion only of the generating units when in one of said positions.

13. In a system of control for electric vehicles, a controller having two operative positions separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side, an auxiliary field-magnet coil for the motor, means operated by the controller for coupling same to a portion only of the generating units and means for altering the particular unit or units connected.

14. In a system of control for electric vehicles, a controller having two operative positions separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side, an auxiliary field-magnet coil for the motor and means operated by the controller for coupling same to a portion only of the generating units, when the controller is in the last-named operative position.

15. In a system of control for electric vehicles, a controller having two operative positions separated by an "off" position, a plurality of electric generating units, an electric motor upon the vehicle, connections with the controller for coupling the generators in multiple and in series to the said motor for varying the power, when at one side of said "off" position, means for reversing the elements of the motor and closing the circuit through a variable resistance, when on the other side, and an auxiliary field-magnet coil or coils for the motor of high resistance.

16. In an electric vehicle, a controller for the motive power, an electric brake-controller, pivoted steering-wheels and driving-wheels for the vehicle, electric braking devices for applying brakes to the driving-wheels and to the pivoted steering-wheels and connections from the said devices to the brake-controller.

17. In an electric vehicle, an electric motor, a controller for the motor, an electric brake-controller, power connections from the motor to the driving wheel or wheels, other wheels for the vehicle loose upon a stationary axle and electric friction-brakes for the last-named wheels.

18. In an electric vehicle, an electric motor, a controller for the motor, having an "off" position, a plurality of power positions, an extra contact adapted to be forced into engagement with a coöperating contact upon the controller when same is in one of its power positions only and a removable operating means as J' for the contact.

19. In an electric vehicle, an electric motor, a controller for the motor, an electric brake-controller, power connections from the motor to the driving wheel or wheels, other wheels for the vehicle loose upon a stationary axle, and electric friction-brakes, consisting of two elements, for the last-named wheels, one of said elements mounted rigidly upon the axle.

20. In an electric vehicle, an electric motor, a controller for the motor, an electric brake-controller, power connections from the motor to the driving wheel or wheels, other wheels for the vehicle loose upon journals attached to a stationary axle and electric friction-brakes, consisting of two elements for the last-named wheels, one of said elements mounted rigidly upon the journal and the other upon the wheel.

21. In an electric vehicle, an electric motor, a controller for the motor, an electric brake-controller, power connections from the motor to the driving wheel or wheels, other wheels for the vehicle loose upon journals attached to a stationary axle, electric friction-brakes, consisting of two elements for the last-named wheels, one of said elements mounted rigidly upon the journal and the other upon the wheel, and flexible conductors between the said friction-brakes and the vehicle-body.

22. In an electric vehicle, an electric motor, a controller for the motor, an electric brake-controller, power connections from the motor to the driving wheel or wheels, other wheels for the vehicle loose upon journals attached to a stationary axle, electric friction-brakes, consisting of two elements for the last-named wheels, one of said elements mounted rigidly upon the journal and the other upon the wheel, a separate joint between the axle proper and the journal and flexible conductors from the brake to the axle.

23. In a system of control for electric vehicles, a controller, a plurality of electric generating units, an electric motor upon the vehicle, having an armature, connections with the controller for coupling the generators in different groups to the motor, means for converting the motor into a generator and closing the circuit through a variable resistance and a plurality of reversing-switches acting upon the armature-circuit only.

24. In a system of control for electric vehicles, a controller, a plurality of electric generating units, an electric motor upon the vehicle, having an armature, connections with the controller for coupling the generators in different groups to the motor, means for converting the motor into a generator and closing the circuit through a variable resistance, two reversing-switches, one being actuated by the controller and independent actuating means for the other.

25. In a controller system for a vehicle, a motor and controller mechanism, a moving part on the controller, an electric storage battery for the vehicle, a charging-terminal for the battery and means for open-circuiting the terminal, operated by the moving part on the controller.

26. In a controller system for a vehicle, a motor and controller, a moving part on the controller, an electric storage battery for the vehicle, a charging-terminal for the battery, a reversing-switch for the vehicle, means for open-circuiting the terminal and a common operating connection for the switch and the means.

27. In a controller system for a vehicle, a motor and controller, a moving part on the controller, an electric storage battery for the vehicle, a charging-terminal for the battery, a reversing-switch for the vehicle, having stationary and movable contacts separated by an open-circuit position and a charging-terminal contact located in the said open-circuit position.

28. In a controller system for a vehicle, a motor and controller, a moving part on the controller, an electric storage battery for the vehicle, a charging-terminal for the battery, a reversing-switch for the vehicle having movable contacts, stationary contacts for the reversing-switch connected with the motor and a charging-terminal so located upon the reversing-switch that the terminal will be open-circuited when the motor-contacts are closed and vice versa.

29. In a system of electric control for vehicles, a storage battery, a motor, a controller for the motor, having a closed and open circuit position, a combined reverse and charging-terminal switch, having a plurality of working positions and a lock for the switch, operated by the controller for holding the switch in one or another of its working positions, when the controller is in its closed-circuit position.

30. In a system of electric control for vehicles, a storage battery, a motor, a controller for the motor, having a closed and open circuit position, a combined reverse and charging-terminal switch, having a plurality of working positions and a lock for the controller, operated from the switch, for holding the controller in its open-circuit position, when the switch is intermediate or between its working positions.

31. In a controller for electric vehicles, a moving part, an independent controller-handle, having a certain motion, a connection between the handle and the moving part for increasing the angle of motion in said part above that of the handle, an indicator for showing the position of the controller and independent angle-increasing means for the indicator.

32. In a controller for electric vehicles, a controller proper, out of view, a controller-handle having a certain angle of motion, a connection between the handle and the controller, for increasing the angle of motion of the controller above that of the handle, and an indicator for showing the position of the controller, consisting of a pointer moving during a portion only of the movement of the controller.

33. In a controller for electric vehicles, a controller proper out of view, a vertically-moving controller-handle, operating connections for working the controller by said vertical movements of the handle, an indicator for pointing out the degrees of elevation of the said handle and thus the position of the controller, the same mounted upon the moving handle.

34. In directible vehicles, a swiveling steering-wheel for the vehicle, mechainsm for directing such wheel, a steering-handle, swinging laterally about a pivot operating connections from such handle to the mechanism and capable at the same time of a vertical movement, a controller proper and a laterally-sliding gear operating as a swiveling connection between the handle and the controller.

35. In directible vehicles, a swiveling steering-wheel for the vehicle, mechanism for directing such wheel, a steering-handle, swinging laterally about a pivot operating connections from such handle to the mechanism and capable at the same time of a vertical movement, a controller proper and a vertically-moving rack-and-pinion operating connection between the handle and the controller.

36. In directible vehicles, a swiveling steering-wheel for the vehicle, mechanism for directing such wheel, a steering-handle swinging laterally about a pivot operating connections from such handle to the mechanism and capable at the same time of a vertical movement, a controller proper, a geared segment on the controller and a coöperating cylindrical rack connected with the handle, serving as operating connection, for the purpose specified.

37. In a controller for an electric vehicle, a pivoted controller-lever, extending near the vehicle-seat, swinging vertically through a short arc, a controller actuated by the lever and a detachable connection between them, whereby the handle may be detached and swung out of its limited arc and away from the seat.

38. In a controller for an electric vehicle, a pivoted controller-lever extending near the vehicle-seat, swinging vertically through a short arc, a controller actuated by the lever and a detachable connection between them, whereby the handle may be detached and swung upwardly and away from the seat.

39. In a controller system for a vehicle, a motor and controller mechanism, a moving part on the controller, an electric storage battery for the vehicle, a charging-terminal for the battery, means for open-circuiting the terminal, an operating device for the means and a lock for the device.

40. In an electric vehicle, a plurality of electric generators, a translating device, electric conductors for the device, an interchangeable non-reversible terminal as $n$ for such conductors and coöperating terminals from the various groups of generators.

41. In a controller for vehicles, an upright stem, a cap for the stem, a head pivoted to the cap, and a horizontally-disposed arm protruding from the head, having an upward curvature, a cylindrical grip lying transversely to the arm at its outer end, and a loosely-mounted swiveling fork between the grip and the arm.

42. In a controller for an electric vehicle, a pivoted controller-lever, extending near the vehicle-seat, swinging vertically through a short arc, a controller actuated by the lever and a detachable connection between them, whereby the handle may be detached and swung out of its limited arc and away from the seat, in combination with a stop for limiting the movement of the lever, when so swung.

43. In a controller for electric vehicles, a steering-handle swinging laterally about a pivot and capable at the same time of a vertical movement, a controller proper, a swiveling operating connection between the handle and the controller and means for adjusting between the controller and the steering-handle.

44. In a controller for a vehicle, a swiveling controller-head, a reverse-switch having two closed-circuit positions, a combined pointer and switch-handle, mounted on the head and swiveling therewith and angle-reducing operating connections from the pointer to the switch, whereby the latter moves approximately through a half-circle, thus pointing oppositely in throwing the switch.

45. In a controller for a vehicle, a swiveling controller-head, a reverse-switch, having two closed-circuit positions, separated by an open-circuit position, a removable combined pointer and switch-handle mounted on the head and swiveling therewith, an angle-changing operating connection from the pointer to the switch and means for preventing the removal of the handle when in the two closed-circuit positions.

ELMER A. SPERRY.

Witnesses:
W. S. ROGERS,
M. C. PRENDERGAST.